(12) United States Patent
Xie et al.

(10) Patent No.: US 9,409,235 B2
(45) Date of Patent: Aug. 9, 2016

(54) GRANULATION OF MOLTEN MATERIAL

(75) Inventors: Dongsheng Xie, Ormond (AU); Bernard Washington, Beaconsfield (AU); Steven Sanetsis, Oakleigh (AU)

(73) Assignee: Commonwealth Scientific and Industrial Research Organisation, Campbell, ACT (AU)

( * ) Notice: Subject to any disclaimer, the term of this patent is extended or adjusted under 35 U.S.C. 154(b) by 604 days.

(21) Appl. No.: 13/001,263

(22) PCT Filed: Jun. 29, 2009

(86) PCT No.: PCT/AU2009/000834
§ 371 (c)(1),
(2), (4) Date: Mar. 11, 2011

(87) PCT Pub. No.: WO2009/155666
PCT Pub. Date: Dec. 30, 2009

(65) Prior Publication Data
US 2011/0180945 A1    Jul. 28, 2011

(30) Foreign Application Priority Data
Jun. 27, 2008 (AU) .............................. 2008903295

(51) Int. Cl.
*B29B 9/00* (2006.01)
*B22F 9/10* (2006.01)
(Continued)

(52) U.S. Cl.
CPC ... *B22F 9/10* (2013.01); *B01J 2/04* (2013.01); *C04B 5/00* (2013.01); *C22B 1/14* (2013.01); *C22B 9/05* (2013.01)

(58) Field of Classification Search
CPC .......... B29C 9/12; B05B 5/04; B05B 5/0407; B05B 3/02; B05B 3/1014; B29B 2009/168; B29B 9/16; B01J 2/04; B22F 9/10; C04B 5/00; C22B 1/14; C22B 9/05
USPC ............................................................. 425/8
See application file for complete search history.

(56) References Cited

U.S. PATENT DOCUMENTS

| 4,218,410 | A |   | 8/1980 | Stephan et al. |
| 5,409,521 | A | * | 4/1995 | Featherstone ............. C21B 3/08 425/8 |
| 5,735,931 | A | * | 4/1998 | Featherstone ............. C21B 3/08 425/8 |

FOREIGN PATENT DOCUMENTS

| JP | 35-1219 A | 2/1935 |
| JP | 51-064456 A | 6/1976 |

(Continued)

OTHER PUBLICATIONS

Japanese Office Action for corresponding Japanese Patent Application No. 2011-515020 mailed Jan. 28, 2014 (6 pages).

(Continued)

*Primary Examiner* — Robert J Grun
(74) *Attorney, Agent, or Firm* — Merchant & Gould P.C.

(57) ABSTRACT

A granulator comprising a rotary atomizer for receiving molten material and projecting droplets of the molten material there from; and an impact surface disposed within the trajectory of the droplets and upon which the droplets impact, the impact surface being at a distance from the rotary atomizer and at an angle such that (i) all or substantially all of the droplets impact the impact surface, and (ii) a substantial portion of the droplets are not fully solidified prior to contact with the impact surface.

7 Claims, 2 Drawing Sheets

(51) Int. Cl.
   *B01J 2/04* (2006.01)
   *C04B 5/00* (2006.01)
   *C22B 1/14* (2006.01)
   *C22B 9/05* (2006.01)

(56) References Cited

FOREIGN PATENT DOCUMENTS

| JP | 52-106453 U | 8/1977 |
| JP | 53-88687 A | 8/1978 |
| JP | 54-038259 A | 3/1979 |
| JP | 55-113806 A | 9/1980 |
| JP | 60-190503 A | 9/1985 |
| WO | WO 2009/155667 A1 | 12/2009 |

OTHER PUBLICATIONS

Japanese Office Action for corresponding Japanese Patent Application No. 2014-108932 mailed May 28, 2015.

\* cited by examiner

GRANULATION OF MOLTEN MATERIAL

This application is a National Stage Application of PCT/AU2009/000834, filed 29 Jun. 20009, which claims benefit of Serial No. 2008903295, filed 27 Jun. 2008 in Australia and which applications are incorporated herein by reference. To the extent appropriate, a claim of priority is made to each of the above disclosed applications.

FIELD OF THE INVENTION

This invention relates to an apparatus and method for granulating a molten material.

BACKGROUND OF THE INVENTION

Some types of molten material granulators include a rotary atomiser. In this type of granulator, molten material is placed in contact with a rotary dish and is then projected radially away from the centre of the rotary atomiser by centrifugal force. Ideally, the projected droplets of molten material sufficiently solidify and cool in the time after being projected from the rotary atomiser and before being collected for further use. Various granulator and rotary atomiser designs currently exist.

Some disadvantages of these current designs are (i) their large dimensions, the granulator often needing to be up to 10 m in radius to allow sufficient solidification of the molten material droplets projected from the rotary atomiser, (ii) the costly inefficient use of large airflows to assist in the cooling of the molten material droplets projected from the rotary atomiser, (iii) the generation of 'slag wool' in molten slag granulators that causes costly clean-ups and decreases operating efficiency of the granulator; slag wool being fibre-like solidified slag that forms from non-ideal rotary atomiser design, and (iv) the residual heat remaining in the projected droplets during the collection stage causing them to stick to surfaces, agglomerate and/or remelt.

SUMMARY OF THE INVENTION

The applicants have designed a molten material granulator including a rotary atomiser that is improved over those currently in existence. The applicants have found that by projecting the droplets towards an impact surface positioned at a reduced distance from the atomiser, well inside the distance at which the droplets are able to fully solidify, those of the partially solidified droplets which are not sufficiently robust split upon impact with the surface. This exposes the still hot inner core material, allowing it to cool faster than otherwise would be possible. Thus greatly reducing the distance of flight and by impacting the partially solidified droplets with the impact surface, the size of the granulator can be greatly reduced and the particles can be cooled without the need to provide cooling air curtains. This further decreases the operating cost of a granulator.

In one aspect there is provided a granulator comprising
a rotary atomiser for receiving molten material and projecting droplets of the molten material therefrom; and
an impact surface disposed within the trajectory of the droplets and upon which the droplets impact, the impact surface being at a distance from the rotary atomiser and at an angle such that
(i) all or substantially all of the droplets impact the impact surface, and
(ii) a portion of the droplets are not fully solidified prior to contact with the impact surface.

As the droplets solidify, it is believed that due to the heat transfer characteristics of the solidifying shell, the liquid core is less able to cool as quickly. The applicant has found that when partially solidified droplets impact the impact surface at least a portion of the partially solidified droplets fracture to expose molten material upon impact with the impact surface.

Additionally, after contacting the impact surface, the impact of the partially solidified droplets with the impact surface re-directs the partially solidified droplets towards a collector.

In a preferred form of the invention, a proportion of the droplets have a maximum dimension or diameter of 3 mm or greater. When the droplets impact on the impact surface, it is preferred that greater than 20 vol % and preferably less than 90 vol % of the droplet has solidified. In previous work, process designs were based on sufficient cooling to substantially solidify before collision to avoid sticking (thereby requiring a large enclosure and longer flight times).

In another aspect there is provided a method of granulating molten material comprising
projecting droplets of the molten material from the rotary atomiser towards an impact surface, a portion of the droplets partially solidifying in flight;
impacting all or substantially all of the partially solidified droplets on an impact surface disposed within the trajectory of the droplets such that a portion of the droplets are not full solidified at impact on the impact surface; and
re-directing the partially solidified droplets towards a collector.

In a preferred form, a portion of the partially solidified droplets are less than 50% solidified. It is preferable that the molten material is slag.

In some embodiments of the above aspects, the angle at which the impact surface is disposed relative to the trajectory may be greater than 30 to less than 75 degrees. In one preferred form the lower end of the range be greater than 45 degrees and the upper end of the range may be less than 60 degrees. The impact angle should not be too great as to cause the partially solidified droplets to stick to the impact surface and the choice of impact angle will depend on the characteristics of the material and the distance from the atomiser and hence the degree of solidification.

In some embodiments the granulator may be an enclosed or substantially enclosed chamber.

DETAILED DESCRIPTION OF THE EMBODIMENTS

Figure 1:
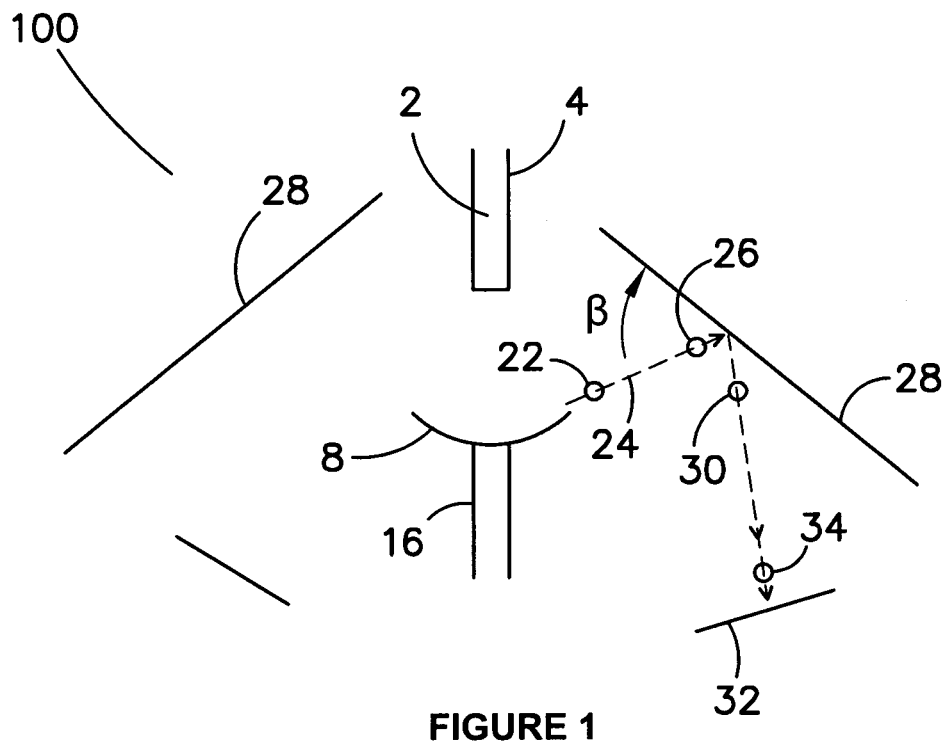
FIG. 1 is a diagram showing a cross-section taken through a central axis of a granulator of the present invention, showing a reduced number of structural features for clarity.

FIG. 1 illustrates the features and operation of the granulator of the present invention. In typical operation, molten material 2 is delivered to the granulator 100 by means of delivery means 4. Delivery means 4 directs molten material 2 to rotary atomiser 8 which is spinning at a spinning rate due to spinning means 16. The spinning about a substantially vertical axis causes the molten material 2 to be projected from the rotary atomiser 8 at a trajectory 24. The droplets of molten material 22 thus formed are projected with a trajectory 24 towards an impact surface 28. Prior to impacting the impact surface 28, a portion of the droplets of molten material 22 are not fully solidified to form partially solidified droplets 26 with a solidified shell around a molten material core. The force of the impact of the partially solidified droplets 26 with the impact surface 26 causes at least the solidified shell of at least a portion of the partially solidified droplets 26 to fracture and form fractured droplets 30. All droplets including the fractured droplets 30, having been redirected by impact surface 28, progress towards a collector 32 while further solidifying.

Significant factors affecting the design of the granulator 100 include: the flow rate of molten material 2 through delivery means 4, the spinning rate of the rotary atomiser 8, the projection temperature of the droplets of molten material 22, the trajectory distance and time of flight of the droplets of molten material 22 prior to impact with the impact surface 28, the dimensions of the droplets of molten material 22, the material that constitutes molten material 2, the absence or presence of additional cooling (such as an annular airflow and/or cooling of the impact surface). That is, the exact design and operating conditions of any one component of granulator 100 is often dependent on the design and operating conditions of other components of granulator 100, as well as being dependent on the physical and chemical properties of the material being granulated. For instance, a hotter delivery temperature may require a longer trajectory prior to impact with impact surface 28; and a molten material having a lower thermal conductivity may require a longer trajectory prior to impact with impact surface 28. Despite this, this description does provide values to serve as a guide for typical design parameters and operating conditions.

Molten material 2 may be any molten material from which it is desirable to produce a granulated form. For instance, the molten material may be a molten metal, polymer, matte or glass. In preferred embodiments, the molten material is a by-product from the process of smelting ore to purify metals (also known as slag). Granulated slag can be used for any purpose, but can be particularly useful in the manufacture of cement and concrete.

Delivery means 4 may be any suitable means known in the art. For instance, delivery means 4 may be a tube, pipe, channel, trough or other form of conduit. A suitable improver atomiser is described in Australian provisional patent application no. 2008903296 and consequent co-pending International patent application, the whole contents of which are incorporated by reference. The molten material 2 may be discharged from the end of delivery means 4 by any means known in the art. For instance, molten material 2 may be discharged by a nozzle, spout, tap or other means of controlling the delivery. Alternatively, molten material 2 may be discharged from the end of delivery means 4 without any other means of controlling the delivery. In the context of slag, the delivery means 4 may be referred to as a slag drop.

The molten material 2 is delivered via delivery means 4 at an elevated temperature (herein after referred to as the 'delivery temperature'). The delivery temperature may be any at which the material is substantially molten, and is dependent on the material itself. In the context of iron making slag, the delivery temperature of molten material 2 may be from about 1400° C. to about 1600° C. Clearly, the delivery temperature may be slightly higher than the temperature at the time the molten material 2 is received by rotary atomiser 8 due to heat loss between the end of delivery means 4 and rotary atomiser 8, but for the purposes of this description the two shall be considered equivalent. The flow rate of molten material 2 through delivery means 4 and into rotary atomiser 8 is variable and dependent on the design and operating conditions of other components of the granulator 100, and on the material being granulated. Typically, the flow rate may be from as little as about 1 kg/min for small plants or test rigs to several tonnes/min in the case of industrial scale plants. This flow rate may be referred to as a tapping rate.

Rotary atomiser 8 is positioned such that molten material 2 discharged from delivery means 4 is received by the receiving portion of rotary atomiser 8. Spinning means 16 is used to rotate or spin the rotary atomiser about a substantially vertical axis. Spinning means 16 may be any known in the art. For instance, spinning means 16 may be magnetically driven or gear driven. The spinning rate is variable and dependent on the design and operating conditions of other components of the granulator 100, and on the material being granulated. Typically, the spinning rate may be from about 600 rpm to about 3000 rpm. The design of the rotary atomiser may be any known in the art. The shape and size of the droplets of molten material 22 is variable and dependent on the design and operating conditions of other components of the granulator 100, and on the material being granulated. Typically, the droplets of molten material 22 are substantially spherical having a diameter of from about 0.5 mm to about 5 mm. The velocity of projection of the droplets of molten material 22 from rotary atomiser 8 is variable and dependent on the design and operating conditions of other components of the granulator 100, and on the material being granulated. Typically, the velocity of projection of the droplets of molten material 22 from the rotary atomiser 8 is from about 1.5 m/s to about 8 m/s.

Rotary atomiser 8 may be constructed from any material known in the art. The preferred requirements for the material of the atomiser are low cost, high thermal conductivity and workability. For instance, rotary atomiser 8 may be constructed from a refractory material, or copper. Preferably, rotary atomiser 8 is constructed from stainless steel or cast iron.

Figure 2:
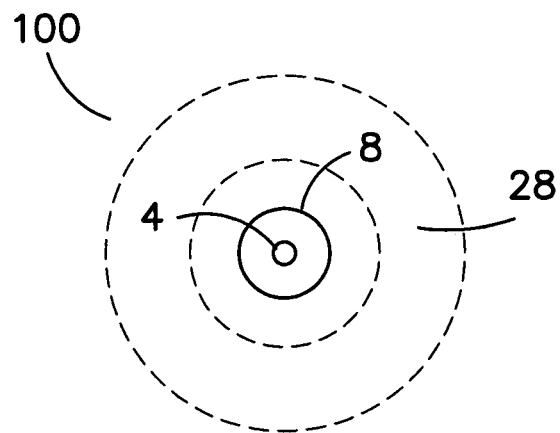
FIG. 2 is a plan diagram of a granulator of the present invention, showing a reduced number of structural features for clarity.

In some embodiments, and with regard to FIG. 2, rotary atomiser 8 is positioned substantially centrally within the granulator 100. More typically, rotary atomiser 8 is positioned substantially centrally within the region defined by the impact surface 28. That is, since the rotary atomiser 8 is spinning and projecting droplets of molten material 22 radially at any and all points around its circumference, it is preferable to have impact surface 28 disposed within the trajectory of all or substantially all of the projected droplets of molten material 22. That is, it is preferable for the impact surface 28 to be annular.

All or substantially all of projected droplets of molten material 22 then follow a trajectory towards impact surface 28. The impact surface is positioned a distance away from the rotary atomiser such that a portion of the droplets are not fully solidified and form partially solidified droplets 26 prior to impacting with the surface. Partially solidified droplets 26 have a solidified outer region or shell and a molten inner region or core. The distance will depend on the molten material, the temperature of the material and the droplet size. The droplet size will in turn be dependent on the speed of rotation of the atomiser and hence exit velocity of the droplet.

As well, impact surface 28 is positioned at a distance and angle such that a substantial portion of partially solidified droplets 26 have not become fully solidified prior to impact, and such that impact of the partially solidified droplets 26 with impact surface 28 causes at least a portion of partially solidified droplets 26 to fracture and form fractured droplets 30. This fracturing of partially solidified droplets 26 causes the solidified outer region to crack, break, rupture or otherwise fracture and exposes at least a portion of molten inner region to the exterior of the fractured droplets 30. Without wishing to be bound by theory, the inventors believe that the exposure of the molten inner region to the exterior allows the fractured droplets 30 to cool and solidify faster than the partially solidified droplets 26 would have in the absence of fracturing on impact with the impact surface 28. The angle at which the impact surface 28 is disposed relative to the trajectory may also be modified to control the force of the impact. The angle β at which the impact surface 28 is disposed relative to the trajectory may be greater than 30 to about 75 degrees. This angle is measured in the radial direction of impact. The lower end of the range may be greater than 45 degrees and the upper end may be less than 60 degrees. Thus preferred ranges of contact angles includes permutations of these limit ranges. The person skilled in the art would understand that whether the partially solidified droplets 26 fracture upon impact with the impact surface 28 is a function of the velocity, the degree of solidification, the angle of impact β, and the size of the partially solidified droplets 26.

Without wishing to be bound by theory, it is believed that collision and splitting (from one large partially solidified droplet into several smaller droplets) may occur for droplets of about 3 mm or larger and preferably less than about 50% solid fraction (volume %). This is equivalent to a linear thickness of solid shell relative to droplet radius of about 20%.

The extent of partial solidification is determined by the droplet flight time (before collision), droplet temperature (more precisely the degree of overheating above liquidus temperature), and velocity (dependent on the cup spinning rate and cup diameter). Viscosity and surface tension of the liquid material may also be considerations.

In our collision experiments, droplets collided with the inclined roof within a fraction of second (flight time). Within the range of flight time before collision (in the order of 0.02 to 0.12 sec), larger droplets (about 3 mm in diameter or larger making up about 1% but greater than zero % of the droplets) are believed to have less than 50% volume solidification and as low as 30% solidification and some of the larger droplets broke up during collision. Smaller droplets (2 mm or smaller) reached a higher solid fraction before collision and did not show much splitting. The applicant has observed that the distance from the atomiser to the impact surface is such that droplets 2 mm or larger (less than 5% but greater than zero % of the droplets) have a solidification of less than 50% by volume at impact.

The collision and splitting is a very fast and to some degree a random process. Larger droplets with less than about 50 vol % solidification seem to have a higher chance of breaking up than smaller droplets with higher solidification.

If droplets have little solidification on the surface, droplets will be flattened and will smear on collision rather than bounce-off and breaking up. It is believed that this occurs when the extent of solidification is lower than a value estimated to be about 20 vol % solid fraction. Accordingly the level of solidification should be greater than 20 vol % and preferably less than 80 vol %. Suitable conditions to avoid smearing could be readily established through testing (eg by the molten material's process conditions such as tapping temperature).

The impact surface may be made from any material known in the art. For instance, the impact surface 28 may be a refractory material or metal. Preferably, impact surface 28 is constructed from stainless steel.

Following impact with the impact surface 28, fractured droplets 30 further solidify and become granulated material 34, which may be collected for further use. Granulated material 34 typically consists of particles of solidified material or material having at least a solidified outer region or shell, and may also have a molten inner region or core. Any collector 32 known in the art may be used for the collection of granulated material 34. For instance, the collector 32 may simply be an opening of any dimensions positioned such that granulated material 34 is capable of exiting granulator 100, or may be an annular trough with at least one aperture for the exit of granulated material 34.

Figure 3:
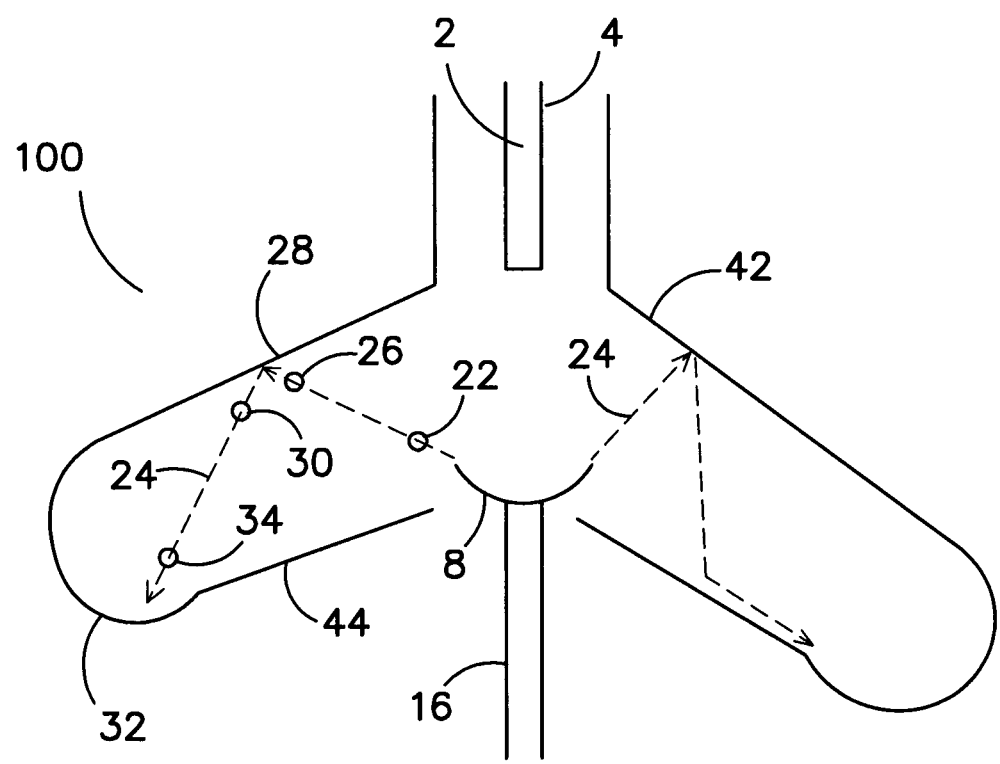
FIG. 3 is a diagram showing a cross-section taken through a central axis of a preferred embodiment of a granulator of the present invention.

FIG. 3 shows a more complete depiction of granulator 100 as it may be in operation. Droplets of molten material 22 are projected from rotary atomiser 8 into a chamber 40, which may be an enclosed or substantially enclosed chamber. After impact of partially solidified droplets 26 with impact surface 28 to form fractured droplets 30, granulated material 34 is directed towards a collector, which in FIG. 3 is depicted as being disposed towards the periphery of granulator 100 as collector 32.

Chamber 40 may have an upper boundary surface 42 that is of a substantially frusto-conical shape (also referred to as a frustum). The frusto-conical shape of upper boundary surface 42 converges upwardly toward delivery means 4 and creates an acute frusto-conical angle with vertical. Upper boundary surface 42 may extend to delivery means 4 or extend only partially to delivery means 4. Impact surface 28 may be positioned within upper boundary surface 42. Preferably, at least a portion of upper boundary surface 42 is impact surface 28.

Chamber 40 may have a lower boundary surface 44. Lower boundary surface 44 may be of any shape. A particular preferred shape for lower boundary surface 44 is one suitable for directing granulated material 34 towards a collector 32. For instance, lower boundary surface 44 may also be of a substantially frusto-conical shape converging either upwardly or downwardly towards the central axis of granulator 100. FIG. 3 depicts lower boundary surface 44 as an upwardly converging frustum. A collector is then preferably positioned within or adjacent to lower boundary surface 44. For instance, in the case of lower boundary surface 44 being an upwardly converging frustum, collector 32 may be positioned at a peripheral location. In the case of lower boundary surface 44 being a downwardly converging frustum, the collector may be positioned at a more central location. In the latter case, the location of the collector need not be at the most central location, but instead may be any position more central than the periphery of the granulator.

Upper boundary surface 42, impact surface 28, and/or lower boundary 44 may be cooled. For instance, upper boundary surface 42, impact surface 28, and/or lower boundary surface 44 may be cooled by air, water, or other refrigerant, or any other material known in the art, by contact of these with the exterior surfaces of upper boundary surface 42, impact surface 28, and/or lower boundary surface 44.

Also shown in FIG. 3 is an alternative trajectory 24. The trajectory 24 is variable and dependent on the design and operating conditions of other components of the granulator 100, and on the material being granulated. Most significantly, the design and operation of the rotary atomiser 8 are important in the nature of the resultant trajectory 24. In both examples of trajectory 24 shown in FIG. 3, the above described embodiments are present. That is, droplets of molten material 22 are projected from the rotary atomiser towards an impact surface 28, and are then redirected as fractured droplets 30 and then granulated material 34 towards a collector 32. In both instances the trajectory of the droplets have a tangential as well as a radial component. In the case of trajectory 24, the particle spirals downwardly on lower surface 44 towards collector 32.

In some embodiments, particularly those where chamber 40 is an enclosed or substantially enclosed chamber, granulator 100 may further include a flow of air to enhance cooling of molten material, assist with the avoidance of aggregation of granulated material 34, and progress granulated material 34 towards a collector. Preferably, the airflow is of an annular nature with substantially no net upward velocity component when in steady state. That is, unlike some granulators of the prior art, the granulator of the present invention does not require an upward airflow when in operation and in order to achieve sufficient cooling of the molten material. For instance, the granulator of the present invention does not require an upward airflow to form a curtain through which the trajectory of the droplets of molten material passes, nor does it require a fluidised bed type arrangement to exist to provide further cooling for partially solidified droplets. Embodiments having an annular airflow are particularly well suited to granulators having a frusto-conical shape and the airflow may be described as cyclonic.

The velocity of air within the granulator 100 is variable and dependent on the design and operating conditions of other components of the granulator 100, and on the material being granulated. Typically, the velocity of airflow is about 2 m/s to about 20 m/s.

The flow rate of air through the granulator is variable and dependent on the design and operating conditions of other components of the granulator, and on the material being granulated, it is desirable for it to be further controllable to allow an additional advantage of the granulator of the present invention to be realised. More specifically, the airflow can be used to assist with the recovery of energy in the form of heat from the molten material. For instance, a lower flow rate of air through the granulator will lead to air exiting the granulator having a higher temperature. Predominantly, the flow rate of air through the granulator is a function of the requisite velocity of airflow and the volume of the granulator. For example, a higher air temperature exiting the granulator will be achieved for a lower granulator volume with a corresponding lower air flow rate. Typically, and in the context of slag, the flow rate of air through the granulator is such that the air exiting the granulator has a temperature of above about 400° C., and in some cases the air exiting the granulator has a temperature of above about 600° C. As well, granulated material exiting the granulator contains energy in the form of heat that can also be recovered. In the context of slag, granulated material exits the granulator with an average temperature below about 800° C. The remaining heat in the discharged granules could be recovered in, for example, a packed bed counter-current heat exchanger known in the art. Energy recovered in the form of hot air can be used for drying, preheating, steam generation, power generation and/or desalination.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A granulator comprising:
   a chamber,
   a rotary atomizer for receiving molten slag within the chamber and mounted to spin about a substantially vertical axis within the chamber and adapted to project droplets of the molten slag along a trajectory, wherein the trajectory is at an angle to the substantially vertical axis; and
   the chamber having an impact surface disposed within the trajectory of the droplets upon which all or substantially all of the droplets impact, and
   the chamber having an air cooling arrangement which creates an airflow of cooling air in the chamber to enhance cooling of the molten slag droplets, said airflow being of an annular nature with substantially no net upward velocity component when in steady state,
   wherein the impact surface is cooled by water or other refrigerant and is disposed above the rotary atomizer, the angle at which the impact surface is disposed relative to the trajectory of the droplets being greater than 30 and less than 60 degrees;
   and wherein the impact surface being at a distance from the rotary atomiser in combination with the angle at which the impact surface is disposed relative to the trajectory of the droplets leaving the rotary atomiser being such that:
   all or substantially all of the droplets impact the impact surface, and
   (ii) a portion of the droplets are not fully solidified prior to contact with the impact surface.

2. The granulator of claim 1 further comprising a collector region for collecting partially solidified or solidified particles after contact with the impact surface.

3. The granulator of claim 2 wherein the collector region is annular shaped and radially outwardly from the impact surface.

4. The granulator of claim 2 further comprising a frusto-conical lower surface directing the particles towards the collector region.

5. A method of granulating molten slag comprising
   projecting droplets of the molten slag from the rotary atomiser towards an impact surface,
   wherein the angle at which the impact surface is disposed relative to the trajectory of the molten slag leaving the atomiser is greater than 30 and less than 60 degrees;
   supplying an airflow of cooling air to enhance cooling of the molten slag droplets, said airflow being of an annular nature with substantially no net upward velocity component when in steady state,
   impacting all or substantially all of the partially solidified droplets on an impact surface disposed within the trajectory of the droplets such that a portion of the droplets are not fully solidified at impact on the impact surface, and
   re-directing the solidified droplets after impact towards a collector.

6. The method of claim 5 wherein the angle at which the impact surface is disposed relative to the trajectory of the partially solidified droplet is greater than 45 and less than 60 degrees.

7. The granulator of claim 1 wherein the exterior surface of the impact surface is cooled.

* * * * *